Figure 5:
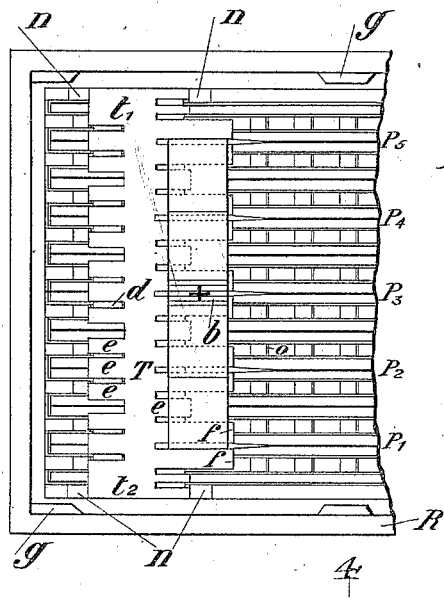

No. 731,429. PATENTED JUNE 23, 1903.
C. BRUNO.
STORAGE BATTERY.
APPLICATION FILED DEC. 4, 1899.
NO MODEL. 3 SHEETS—SHEET 1.
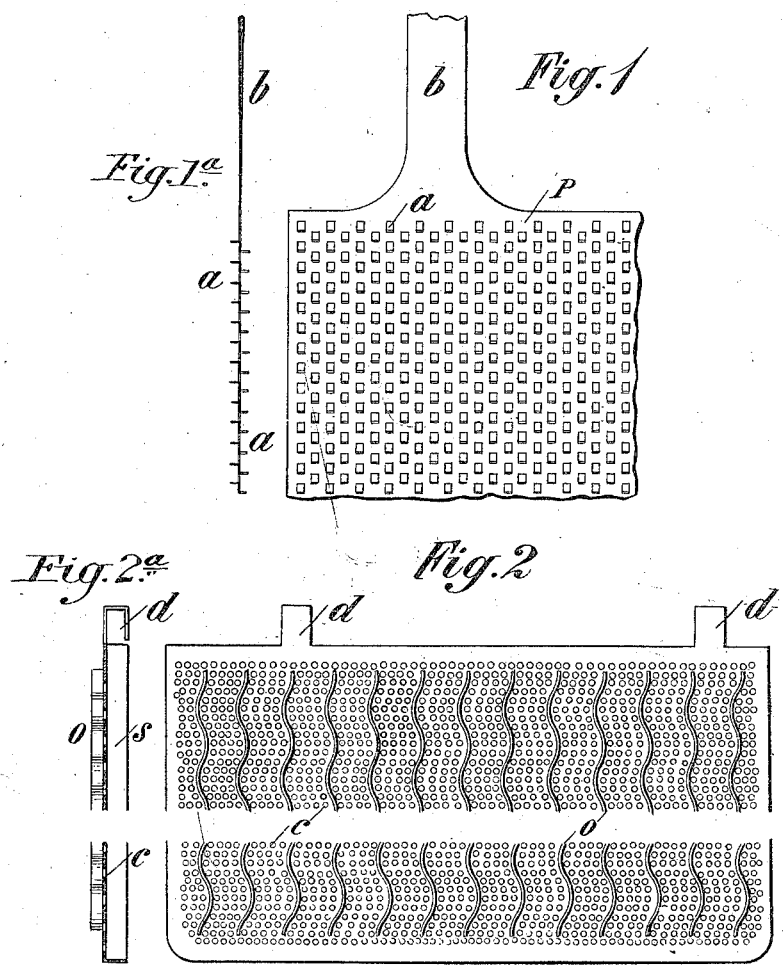

No. 731,429. PATENTED JUNE 23, 1903.
C. BRUNO.
STORAGE BATTERY.
APPLICATION FILED DEC. 4, 1899.
NO MODEL. 3 SHEETS—SHEET 2.
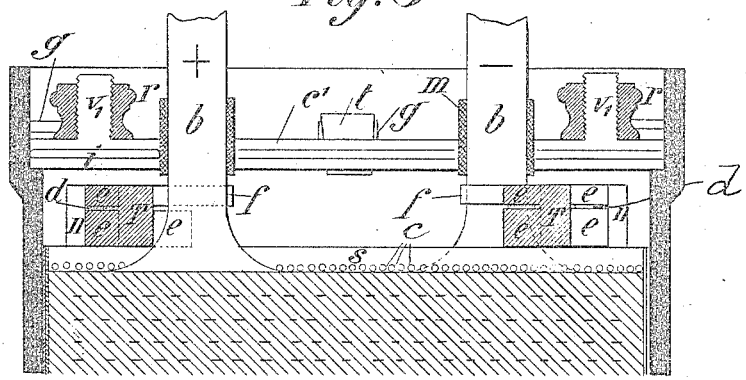
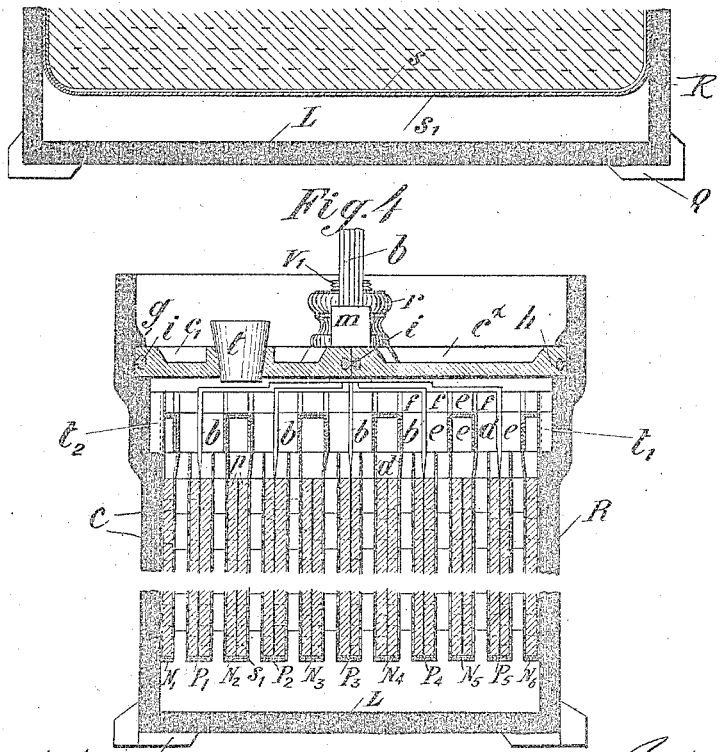
Witnesses: Inventor
Carlo Bruno,
By Wm. E. Boulter,
Attorney No. 731,429. Patented June 23, 1903.

UNITED STATES PATENT OFFICE.

CARLO BRUNO, OF ROME, ITALY, ASSIGNOR TO LUIGI PALESTINI, OF ROME, ITALY.

STORAGE BATTERY

SPECIFICATION forming part of Letters Patent No. 731,429, dated June 23, 1903.

Application filed December 4, 1899. Serial No. 739,192. (No model.)

*To all whom it may concern:*

Be it known that I, CARLO BRUNO, mechanical engineer, a subject of the King of Italy, residing at Rome, Italy, (whose post-office address is 12 Via Federico Cesi, Rome, Italy,) have invented certain new and useful Improvements in Storage Batteries, (for which I have obtained Letters Patent in the Kingdom of Italy, dated July 6, 1899, Reg. Att. Vol. III, No. 1,) of which the following is a specification.

The object of my present invention is to provide a storage battery for electric traction incorporating the advantages of lightness, rapidity of reaction, and resistance of the active mass against the shocks of the vehicle.

Lightness and efficiency, which are of course the desiderata for storage batteries for use in motor-vehicles, have been sought to be attained by reducing to the greatest possible extent the weight of the conducting-plates and by increasing as much as possible the points of contact of the latter with the active mass. Thus, for example, it has been proposed to provide the lead or like plates with projections extending obliquely from the plate upon both sides and projecting into the active mass and resting upon the right and left hand sides against the inner walls of the electrode-containers, so that the plate is maintained in the middle. In order to fulfil these requirements, the projections and also the plate must be comparatively thick, and therefore heavy, in order to prevent it from buckling. The oblique arrangement of the projections renders the introduction of the active mass extremely difficult, for if it is attempted to introduce it at the side the projections, unless they are very thick and strong, will be bent back against the plate, and therefore become quite useless. It is consequently necessary to introduce the mass into the electrode-holders from above. Apart from this, if the conducting-plates are slightly withdrawn the oblique projections catch in the holes in the containers and are liable to bend or break off. Again, it has been suggested to increase the contact-surface of the conductors by means of metallic nets or gauzes, which maintain the mass upon both sides and which are connected one with the other by transverse pins. This method is undesirable owing to the fact that, in the first place, the active mass is liable to fall through the net, and, in the second place, the pins supporting the additional contact-surfaces are not in one piece with the nets, so that at their point of attachment the conductor will be interrupted by the mass and fluid which will penetrate between the parts. According to my invention I obviate these defects in an extremely simple manner by providing a very thin conducting-plate of lead or the like (of less than the tenth of a millimeter in thickness) by rolling and stamping out of the plate itself upon one or both sides projections at right angles to the plate. It is important that this should be effected by stamping, for by pressing or casting these extremely fine projections would break off and remain in the wooden molds. That the projections should be perpendicular to the plate is still more important, because if this is so I am able without any danger of bending the projections to apply the mass which has previously been rolled or otherwise suitably formed into sheets laterally to the metal plate by a suitable process in such a manner that an endless strip of the mass is pressed upon an endless strip of lead plate provided with projections in a continuous manner and then cut into suitable lengths.

A plate of the above-described thinness, which is of course liable to bend easily, cannot be allowed to stand upon the bottom of the container nor can it be suspended in the usual manner unless it is provided with a handle, which would greatly increase its weight. The suspension is effected by the employment of a pocket or casing, of celluloid or the like, perforated in the usual manner, which casing is suspended upon transverse strips, provided on the general container by means of strap or loop-like continuations of their upper portions. I stiffen these pockets laterally by providing upon their sides vertical strips of celluloid or similar material, which may advantageously be corrugated, thereby maintaining said pockets at a predetermined distance one from the other, so that each group of electrodes constitutes a compact assemblage.

In order that my present invention may be more clearly understood, I will proceed to describe same with reference to the annexed drawings representing one of its forms of execution, and in which—

Figure 6:
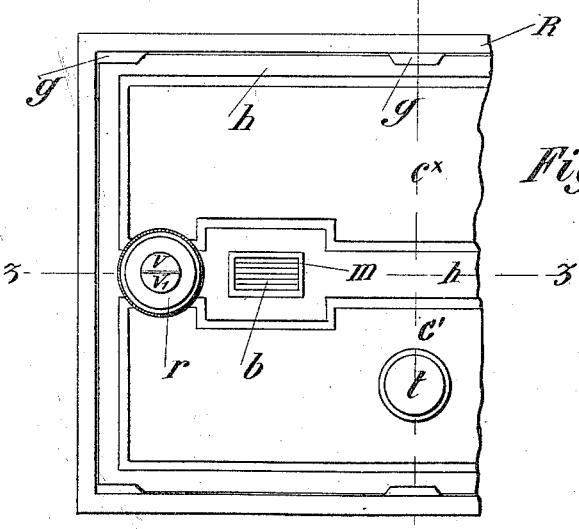

Figure 1 shows a conductor-plate. Fig. 1ᵃ is an end elevation of the parts seen in Fig. 1; Fig. 2, the support of same. Fig. 2ᵃ is a vertical transverse section of the part seen in Fig. 2. Figs. 3 and 4 are sectional views of battery on lines 3 3 and 4 4, respectively, of Fig. 6. Fig. 5 is a plan view of the cell in which the cover has been omitted, and Fig. 6 is a plan view of same with its cover in position.

The conductor-plate P, which, according to the various types of batteries, may be of lead, copper, or zinc, is of thin sheet-lead of a few tenths of millimeter of thickness in my present form of execution. Its two faces are provided with a plurality of points $a$, and the rim $b$ of the lead plate is reinforced in form of tails and serves as a conductor.

In Figs. 4 and 5 the positive plates are lettered $P'$ $P^2$ $P^3$ $P^4$ $P^5$ and the negative ones $N'$ $N^2$ $N^3$ $N^4$ $N^5$ $N^6$.

The active mass may consist of a paste of powdered oxid of lead and carbon bound together by the acid and render the mass in any known way extremely porous without increasing its weight, while in the old constructions of batteries the porosity can only be obtained by considerably increasing their dimensions and the weight of their support-plates.

The support-boxes are made of a resistant non-conductive material—such as celluloid, hard rubber, &c. The two plates $s$ $s'$, Figs. 2 and 3, are provided with a number of holes $c$, one of the plates, as $s$, being provided with corrugated bands of equivalent material. The support T, made of hard rubber, celluloid, or other equivalent material, stands with its ends $t'$ $t^2$ on the inner rim of the receptacles, Figs. 3 and 5, and is fixed in position by means of two extensions or lugs $n$ $n$ of the receptacle. Tongues $d$ on the upper edges of the plates $s$ and of an angular or inverted-U shape are inserted into the recesses between the lugs $e$ $e$ of the supports to fix the boxes in position, while between the lugs $f$ $f$ are inserted the conducting-tails $b$ of the plates. The receptacle R, Figs. 3 to 6, consists in a hard-rubber box having an inner flange for the cover and the supports T. Lugs Q hold the boxes apart from each other to allow the air to circulate freely. The cover consists of two rectangular sections $c^×$ $c'$, Figs. 3 to 6, the rim $h$ of which is grooved and has inserted into it a rubber band $i$. In order to shut the box R, it is sufficient to lower the cover-sections $c^×$ $c'$, Figs. 4 and 6, and screw the rings $r$ to the two bars $v$ $v'$. The rubber band $i$ forms a tight closure with the walls of the box and the mantles $m$ surrounding the conductors $b$.

$g$ represents studs or shoulders which engage over the sections of the cover.

Two bundles of conductors of opposite polarity of two contiguous batteries may be connected by soldering, bolting, clamping, or by any other suitable means.

$t$ is a stopper closing an aperture in the cover, through which aperture the battery liquid may be introduced.

In motor-cars it is not necessary that the receptacles be hermetically closed, and the cover may be replaced by one or more perforated plates of celluloid, hard rubber, or similar material.

In the type of battery forming the object of my present invention the conductor-plates provide a large surface, the points $a$ penetrating into the active mass and the paste in turn being submerged in the electrolytic liquid, so that all particles of the active mass are surrounded by the necessary quantity of liquid in order that the reactions may take place with great rapidity in the whole of the mass, so that the inner resistance is thereby diminished, and also the drawbacks resulting in other batteries from the falling down of the active mass are diminished. The metal is utilized as conductor, while a lighter material is used as support. The corrugated bands at last hold the plates at a desired and constant distance apart from each other and stiffen them, so as to render the whole of the battery as stiff as a block. Besides, the corrugations of these plates provide channels of so small dimensions as to oppose a great resistance to the movement of the liquid, which, as a matter of fact, remains almost still between the various boxes and is not thrown out by the shocks of the vehicle.

I desire it to be clearly understood that many different arrangements and other materials than those hereinbefore described may be used without departing from the gist of my invention, and

What I claim as new, and desire to secure by Letters Patent, is—

The combination with a receptacle of a series of boxes or cases arranged therein, the walls of each box being perforated, active material contained in each box, a conducting-plate arranged within the active mass and having points projecting laterally from each face into the active material, sustaining means at the upper edges of the boxes, the terminals on the conducting-plates, the supports T, of non-conductive and non-corrosive material, secured to the receptacle and having lugs $e$ $f$ with which engage the sustaining means on the boxes and the terminals on the conducting-plates respectively.

In witness whereof I have hereunto signed my name in the presence of two witnesses.

BRUNO, CARLO.

Witnesses:
S. B. ZRAMARDT,
CAMILLO PERRONS.